(12) United States Patent
Martin et al.

(10) Patent No.: US 12,355,617 B1
(45) Date of Patent: *Jul. 8, 2025

(54) CONFIGURING A VIRTUAL ASSISTANT BASED ON CONVERSATION DATA IN A DATA-COMMUNICATIONS SERVER SYSTEM

(71) Applicant: 8x8, Inc., Campbell, CA (US)

(72) Inventors: Bryan R. Martin, Campbell, CA (US); Matt Taylor, Campbell, CA (US); Manu Mukerji, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,311

(22) Filed: Apr. 10, 2024

Related U.S. Application Data

(63) Continuation of application No. 17/332,339, filed on May 27, 2021, now Pat. No. 11,979,273.

(51) Int. Cl.
| | |
|---|---|
| H04L 41/0803 | (2022.01) |
| G06F 3/16 | (2006.01) |
| G06F 16/23 | (2019.01) |
| G06F 16/65 | (2019.01) |
| G06F 40/279 | (2020.01) |
| G10L 15/26 | (2006.01) |
| H04L 41/08 | (2022.01) |
| H04L 51/02 | (2022.01) |

(52) U.S. Cl.
CPC .......... *H04L 41/0803* (2013.01); *G06F 3/167* (2013.01); *G06F 16/23* (2019.01); *G06F 16/65* (2019.01); *G06F 40/279* (2020.01); *G10L 15/26* (2013.01); *H04L 41/0876* (2013.01); *H04L 51/02* (2013.01)

(58) Field of Classification Search
CPC ..... H04L 41/0803; H04L 51/02; H04L 41/08; H04L 41/0876; G06F 3/167; G06F 16/23; G06F 16/65; G06F 40/279; G06F 3/16; G06F 3/01; G06F 16/61; G06F 40/30; G10L 15/26

See application file for complete search history.

(56) References Cited

U.S. PATENT DOCUMENTS

| | | | |
|---|---|---|---|
| 11,355,098 B1* | 6/2022 | Zhong | G10L 15/22 |
| 2013/0332162 A1* | 12/2013 | Keen | G06F 16/00 |
| | | | 704/235 |
| 2018/0131904 A1* | 5/2018 | Segal | G11B 27/031 |
| 2019/0384794 A1* | 12/2019 | Holly, Jr. | G06F 16/951 |

(Continued)

*Primary Examiner* — Schquita D Goodwin
*Assistant Examiner* — Mehulkumar J Shah
(74) *Attorney, Agent, or Firm* — Vista IP Law Group, LLP

(57) ABSTRACT

In one example, a server system interfaces with a plurality of remotely-situated client entities to provide data communications services. The system uses processing circuitry for: accessing an archive of digital voice data indicative of transcribed audio conversations respectively involving different client stations participating in data communications; correlating a text-based message received by a virtual assistant and associated with one of the different client entities, with at least one intent or at least one topic associated with the archived digital voice data; and automatically configuring the virtual assistant, based on the text-based message being correlated and via the data-processing computer circuitry, to address or otherwise process the received text-based message.

20 Claims, 4 Drawing Sheets

(56) References Cited

U.S. PATENT DOCUMENTS

2020/0193972 A1\* 6/2020 Feinauer ................ G10L 15/075
2020/0244605 A1\* 7/2020 Nagaraja ................. H04L 51/02
2020/0344219 A1\* 10/2020 Malhotra ............ G06F 16/2457
2021/0400142 A1\* 12/2021 Jorasch ............... H04L 65/1069

\* cited by examiner

CONFIGURING A VIRTUAL ASSISTANT BASED ON CONVERSATION DATA IN A DATA-COMMUNICATIONS SERVER SYSTEM

RELATED APPLICATION DATA

This application is a continuation of U.S. patent application Ser. No. 17/332,339 filed on May 27, 2021, now U.S. Pat. No. 11,979,273. The entire disclosure of the above application is expressly incorporated by reference herein.

OVERVIEW

Aspects of various embodiments are directed to capturing and analyzing digital voice data in a data-communication server system such as a broadband server and/or a Voice over Internet Protocol (VOIP) system, which is used to identify an outcome of a conversation based on a tone/sentiment and/or keywords. In the following discussion, various implementations and applications are disclosed to provide an understanding of the instant disclosure by way of non-limiting example embodiments exemplified by way of data communications which typically involve a data-communication server communicating with an endpoint device, such as a VoIP-enabled endpoint device ("VOIP device") via a broadband network (e.g., Internet, WiFi, cellular) to connect with the data-communication server that is managed by an data-communication provider. Through such a server, call routing and other data communications services are managed for the endpoint device.

Computer servers are increasingly being used to provide various services over a network including, but not limited to, data communications services such as VOIP calls, video conferencing, call exchange servers, packet switching, and traffic management as well as non-VOIP services including, but not limited to: website hosting, remote data storage, remote computing services, and virtual computing environments.

The use of data communications services has been widespread and significant in terms of both numbers of users and types of services being made available. This growth can be attributable to any of a wide variety of socio-economic changes such as the mobility of users of these services, the types and reduced costs of portable communication tools, and the ever-evolving technology adapting to the personal and business needs of the communications users.

These and other matters have presented challenges to efficiencies of configuring virtual assistant implementations, for a variety of applications.

SUMMARY

Various example embodiments are directed to issues such as those addressed above and/or others which may become apparent from the following disclosure concerning configuring a virtual assistant based on analysis of text-based data and digital voice data in a data-communications server system.

A number of aspects are directed to a data-communications system that includes a communications server (e.g., implemented using one or more data centers via the cloud) that interfaces with a plurality of remotely-situated client entities to provide data communication services and processing circuitry coupled to a memory circuit and to the data-communication server. The data-communications server is operated by a data communications provider, where the data-communications server on the data communication provider side, is used to provide data-communication services to a multitude of client entities. The processing circuit, which can be part of or separate from the data-communication server, is in communication with the data-communications server and can analyze digital voice data that represents audio (e.g., spoken) conversations between agents of the client entities and other personnel, such as customers.

In a more specific example embodiment, the processing circuitry can access an archive of digital voice data indicative of transcribed audio conversations between a client station and another station participating in data communications via the data communications services, where the client station is associated with one of the client entities. The archived digital voice data can include keywords associated with at least one intent or at least one topic of the transcribed audio conversations. Similarly, the processing circuitry can identify keywords (and/or contexts) in a text-based message received by a virtual assistant (e.g., which may be text-based in that it is enable to receive and process text messages and/or voice-based messages in that it is enabled to receive and process voice messages) associated with the remotely-situated client entity, and correlate the received message with at least one intent or at least one topic by matching keywords from the archive of digital voice data with the identified keywords from the text-based message. In response, the processing circuitry can automatically configure the virtual assistant associated with the remotely-situated client entity to address the received text-based message, based on the correlation.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
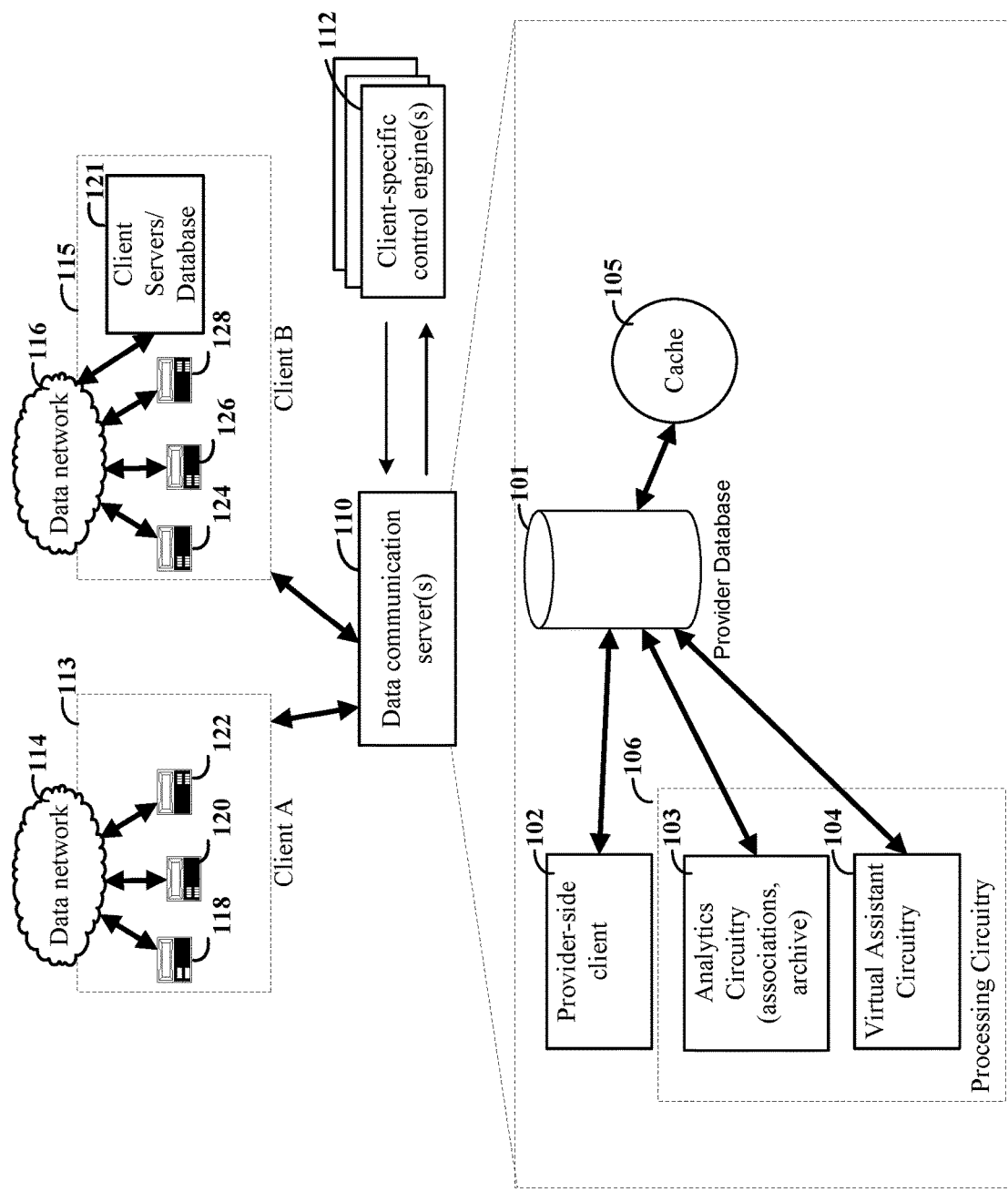
FIG. 1 illustrates an example data-communications system, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving analysis of text-based data and digital voice data in a data-communications server system. In certain implementations, aspects of the present disclosure have been shown to be beneficial when used in a data-communications system including a data communications server that interfaces with a plurality of remotely-situated client entities. While the present disclosure is not necessarily limited to such data communications systems as described herein, for purposes of facilitating understanding and appreciation of certain embodiments, the following discussion uses such data-communications based services and systems in the context and on behalf of client entities which subscribe to such services from a data communications service provider (with a server).

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For case of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

According example embodiments and aspects of the present disclosure, users of a data-communications system can use a plurality of communication services to communicate with clients and other professionals and to carry out various tasks. For example, agents of a client entity can use a private network application to generate work products, a cloud-based application to manage service issues, another cloud-based application to manage direct communications such as email and chat messages, and yet another cloud-based application to manage financial matters such as billing and invoicing. In many instances, it can be beneficial for an entity subscribed to or that otherwise uses the data-communications system to analyze audio and text conversations across the entity (or across many entities) to improve subsequent interactions with the client or professional.

For example, a virtual assistant or intelligent personal assistant can be used to improve and/or supplement communications with clients (e.g., customers). As used herein, a virtual assistant refers to or includes a dynamic series of inquiries provided to, and associated responses received from, a sender of a data communication (such as a customer of a client entity). A virtual assistant can be used to supplement and/or replace a live telephone conversation between the parties, and can in many instances improve the services provided to the client (e.g., customer). In some instances, the term "chatbot" is used to refer to a text-based or text-communicative virtual assistant generally, or specifically those text-based virtual assistants accessed by online (e.g., network-based) chat systems. A chatbot (also known as a smartbot, talkbot, chatterbot, Bot, IM bot, interactive agent, conversational interface or artificial conversational entity) refers to or includes a computer program or an artificial intelligence system which conducts a conversation via auditory or textual methods. Such programs can be designed to simulate how a human would behave as a conversational partner, and can be used for various practical purposes including customer service or information acquisition.

Additionally, as a particular agent of an entity is conversing vocally with a client, the spoken conversation can be captured and transcribed from audio to digital voice data (e.g., audio to data). In specific aspects, a data-communications server operated by the data-communications provider can capture and analyze conversations of many (e.g., 10,000 or more) agents, which can be stored in a directory. A client on the agent side can communicate with a web client, such as a Virtual Contact Center (VCC) web client, and a client on the provider side. In some embodiments, the client on the agent side can transcribe the conversation from audio to the digital voice data. In other embodiments, the client on the agent side can communicate the audio to a data-communications server operated by the entity, which transcribes the audio to digital voice data using processing circuitry in communication therewith. The processing circuitry can form part of the data-communications server or be separate therefrom. As used herein, the digital voice data is indicative of transcribed audio conversations between agents and others (e.g., customers or other external personnel) of remotely-situated client entities.

In specific embodiments, the processing circuitry analyzes the received digital voice data, the digital voice data being from the data communication services provided by the data-communications server. The analysis can include identifying keywords from the digital voice data, which can be, alone or together, associated with at least one intent or at least one topic of the transcribed audio conversation.

In various specific embodiments, the processing circuitry identifies keywords in a text-based message received by a virtual assistant associated with the remotely-situated client entity. However, the present disclosure is not so limited as the virtual assistant may be more capable of receiving and processing different types of communications such as for receiving and processing text-based and/or voice-based messages which are converted to digital form to become effectively text-based messages.

The processing circuitry can correlate the text-based and/or voice-based messages with at least one intent or at least one topic by matching keywords from the archive of digital voice data with the identified keywords from the text-based message. Such correlation can be in response to identifying the keywords in the message, and/or in response to receiving the keywords, such as from a third-party service.

In response to the correlation of the text-based message with at least one intent or at least one topic, the processing circuit can automatically configure the virtual assistant associated with the remotely-situated client entity to address the received text-based message, based on the correlation. For instance, the processing circuitry is configured and arranged to present to the participating station a dynamic series of inquiries to address text-based messages received by the text-based virtual assistant, and to automatically adjust the dynamic series of inquiries based on the correlation. In various example embodiments, the processing circuitry is configured and arranged to present the dynamic series of inquiries to the participating station as part of a virtual assistant displayed on a graphical user interface of the other participating station or a voice prompt provided to the other participating station, based on the correlation.

In various example embodiments, the correlation of keywords to particular topics and/or intent can be user-configurable. For instance, the processing circuitry can be configured and arranged to provide to each respective client station, an option to configure the virtual assistant and specify different sets of inquiries to be presented to the participating station in response to the at least one intent or at least one topic for the text-based message meeting predefined client-specific criteria. The text-based message can be received as part of a text-based virtual assistant session, and the processing circuitry can be configured and arranged to terminate the text-based virtual assistant session in response to an indication that the text-based message was addressed using the text-based virtual assistant. In such embodiments, the processing circuitry is configured and arranged to maintain a client-specific database that correlates keywords identified in user-data communications with at least one issue or topic. Using the client-specific database, the server is configured and arranged to compare a keyword identified from the subsequent text-based messages with information stored in the client-specific database, and generate the dynamic series of inquires based on the comparison.

Additionally, the processing circuitry can be configured and arranged to present to the participating station a dynamic series of inquiries to address text-based messages received by the text-based virtual assistant. The processing circuitry can automatically adjust the dynamic series of inquiries responsive to input received via the text-based virtual assistant, and route the text-based message to a particular branch or extension of the client entity based on the correlation and the input received via the text-based virtual assistant.

In some example embodiments, the processing circuitry is configured and arranged to analyze the archive of digital voice data indicative of transcribed audio conversations between the client station and the other participating station to identify keywords and speech characteristic parameters associated with at least one intent or at least one topic of the transcribed audio conversations. Based on the analysis of the archive of digital voice data, the processing circuitry can predict at least one intent or at least one topic of the communication message (e.g., voice-based and/or text-based message) based on identified keywords and/or speech characteristics of the text-based message as correlated with the archive of digital voice data. The processing circuitry can then supplement the archive of digital voice data to include the correlation between the identified keywords and characteristics of the text-based message and the intent and/or topic, such that the correlation can be used to identify an intent and/or topic of subsequently received text-based messages.

While non-speech characteristics/parameters may also be accounted for (e.g., emojis, symbols and non-letter characters such as "!!!", "~" and "?"), exemplary speech characteristic parameters can include a frequency, wavelength or velocity, and/or amplitude of the audio. In some embodiments, the speech characteristic parameters can be compared to a baseline of the agent to determine a tone. In other embodiments and/or in addition, speech characteristic parameters of the customer can be compared to thresholds to determine a tone. In a number of embodiments, the threshold can be different for different geographic regions, different types of customers (e.g., age, sex), different industries, among other types of classifications. In addition, particular keywords can be associated with and/or indicate a greater probability of a particular tone, sentiment, and/or outcome. As a particular example, the phrases "I want to speak to a manager" or "What is your name" can be associated with a conversation that is not going well for the agent. In other instances, "What is your name" at a particular frequency can be indicative of a positive outcome (e.g., an agent resolves an issue and the customer would like to commend the agent).

Although as may be appreciated by one of ordinary skill in the art, embodiments are not so limited and can include a variety of different associations. Further, in various embodiments, the same keywords or phrases can indicate different tones or outcomes for different types of customers.

In some example embodiments, the processing circuitry is configured and arranged to present the dynamic series of inquiries to the participating station as part of a text-based virtual assistant. In such embodiments, although the virtual assistant is provided in a text format, the processing circuitry can route the text-based message to a representative of the client entity based on the input received (e.g., via the text-based virtual assistant) and in response to an indication that the text-based message was not addressed during using the virtual assistant. In such example embodiments, the processing circuitry is configured and arranged to generate a transcript of the dynamic series of inquiries and responses provided using the virtual assistant; and provide the transcript from the virtual assistant to the representative in response to the routing.

Turning now to the figures, FIG. 1 illustrates an example of a data-communications system, consistent with embodiments of the present disclosure. As illustrated in FIG. 1, the data-communications system includes a data-communications server 110 configured to provide data communication services, including data communications such as VOIP calls, for a plurality of endpoint devices 118, 120, 122, 124, 126, 128 connected in one or more data networks 114, 116. Although FIG. 1 illustrates two data networks 114, 116 communicatively coupled to the data-communications server 110, examples are not so limited and the data-communications server 110 can be communicatively coupled to three or more data networks. Various specific embodiments are herein directed to an apparatus that includes the data-communications server 110 and processing circuitry 106.

The endpoint devices are circuit-based instruments that are used by personnel (or users) and include data communications-enabled circuitry, such as VoIP-enabled endpoint devices (e.g., IP phones, smart phones, tablets, and/or desktop computers with appropriate VoIP software applications) and/or non-data communication/VoIP enabled endpoint devices (e.g., plain old telephone service (POTS) telephones and cellular-capable devices). Each endpoint device is respectively associated with an account of a respective client. Endpoint devices can be associated with a particular client account by registering the endpoint device with a particular client account serviced by the data-communications server 110. Registered devices for each client account can be listed in a respective account settings file (not shown) stored by the data-communications server 110. In this example, endpoint devices 118, 120, and 122 are associated with an account 113 for a first client A and endpoint devices 124, 126, 128 are associated with an account 115 for a second client B. In such a manner, a plurality of endpoint devices can each be serviced by the data-communications server 110 in accordance with the present disclosure. One or more of the clients can have client servers and/or databases 121 used to implement a variety of different services.

The system can include one or more processing circuits configured to implement client-specific control engines 112, which are configured to adjust the data-communications provided for each client account according to a respective set of control directives. For instance, the client-specific control engines 112 can adjust routing of a data (e.g., VOIP)

communication for a client account by generating client-specific sets of control data to the data-communications server 110.

Different embodiments can implement the client-specific control engines 112 in various locations. For example, client-specific control engines 112 for one or more client accounts can be implemented in a central server connected to, or incorporated with, the data-communications server(s) 110. Additionally or alternatively, one or more client-specific control engines 112 can be implemented by one or more processing circuits maintained by the client (e.g., server/database 101). Similarly, the control directives can be stored locally within the client-specific control engines, or stored remotely (e.g., in a centralized database, in a database maintained by the client or a combination thereof).

In various embodiments, the data-communications system can track a variety of parameters and/or metrics related to calls made or received by the agents of a client entity via processing circuitry 106 that is communicatively coupled to the data-communications server 110. Although the processing circuitry 106 is illustrated as a component of the data-communications server 110, embodiments are not so limited and the processing circuitry can form part of or be separate from the data-communications server 110. The parameters can include information such as average call duration, compliance of call opening and account information, identification of issues and troubleshooting, resolution, professionalism, and other metrics. The parameters can be scored (e.g., percentage or other value scored) to rate the particular agent on each particular call and to form a metric used to assess an agent. In some embodiments, the parameters and/or metrics can be assessed automatically by the system using keywords. In other embodiments and/or in addition, the calls are recorded and can be replayed for a person to score (or update an automatic score) on the metrics. The parameters and/or metrics can be used to determine an outcome of the call. For example, the resolution can be indicative of the outcome. The scores can be reviewed upon recording the calls which can be reviewed by a reviewer. For example, the reviewer can listen to the call recording while a user interface is displayed on a computing device associated with the reviewer. The user interface displayed can illustrate a timeline of the recorded call, which can show timing of the current voice data being played. The timeline can allow the reviewer to navigate within the call by selecting portions of the timeline to change what the reviewer is listening to. Additionally, the agent and the customer can have different waveforms for efficient reviewing. In other embodiments, other types of analysis are used, as further described herein.

In a number of embodiments, a particular client can customize the metrics that are tracked. Such customization can include the type of metrics, values given, and/or particular phrases or statements for complying with the metric (e.g., a specific call opening). For example, the customization can include definitions of performance expectations and scores, as well as performance thresholds for various metrics.

In a number of embodiments, a particular client can customize the metrics that are tracked. Such customization can include the type of metrics, values given, and/or particular phrases or statements for complying with the metric (e.g., a specific call opening). For example, the customization can include definitions of performance expectations and scores, as well as performance thresholds for various metrics.

As previously described, client-specific control engines can be used to facilitate adjustment of a variety of remote services including, for example, data-communication services such as VoIP calls, audio and/or video conferencing, general private branch exchange services, packet switching, chat, and traffic management as well as non-VOIP services including, but not limited to, website hosting, remote data storage, remote computing services, and virtual computing environments. One or more of such services can be provided, for example, by a cloud computing network having one or more servers configurable for a plurality of clients.

The data-communications server 110 interfaces with the plurality of remotely-situated client entities to provide data communications services. As illustrated in the lower portion of FIG. 1, various example embodiments can include a data-communications server 110 having or otherwise being in communication with a plurality of modules and circuitry (e.g., sets of task-specific CPU instructions). Each client entity that is communicatively coupled to the data-communications server 110 can access data and/or services provided by the data-communications server 110. The system (via the data-communications server 110) can include a provider-side client module 102 and processing circuitry 106 that includes analytics circuitry 103 and feedback circuitry 104, among other components. In specific embodiments, data-communications server 110 can capture and analyze digital voice data from spoken conversations between agents of the client entity and customers. The spoken conversations can be transcribed from audio to digital voice data by the data-communications server 110, the endpoint device of the agent via a client on the endpoint device, and/or client data-communications server. The transcription of the spoken audio words to digital voice data can occur via a variety of methods.

As may be appreciated by one of ordinary skill in the art, audio can be transcribed to text using a variety of techniques. As an example, an audio file can be generated and provided to speech recognition circuitry, which can be part of the endpoint device, the data-communications server 110, or other external circuitry. The audio file, which includes an acoustic signal received by a microphone of the endpoint, is converted or transcribed to text (e.g., a set of text words) by the speech recognition circuitry. In various embodiments, the speech recognition circuitry can use a voice model and/or database of words for converting or transcribing the audio to text. For example, the speech recognition circuitry can index the words in the audio file to identify words or phrases, such as using an extensible markup langue (XML), structured query language (SGL), mySQL, idx, and other database language. For more general and specific teachings on transcribing audio to text, reference is made to U.S. Publication No. 2009/0276215, filed on Apr. 17, 2007, entitled "Methods and Systems for Correcting Transcribed Audio Files;" U.S. Pat. No. 7,236,932, filed Sep. 12, 2000, entitled "Method of and Apparatus for Improving Productivity of Human Reviewers of Automatically Transcribed Documents by Media Conversion Systems;" and U.S. Pat. No. 6,424,935, filed Jul. 31, 2000, entitled "Two-way Speech Recognition and Dialect System," each of which are fully incorporated by reference for their teachings.

As illustrated, the data-communications server 110 interfaces with a plurality of remotely-situated client entities and includes or is otherwise in communication with processing circuitry 106. The processing circuitry 106 can receive digital voice data indicative of transcribed audio conversations between a plurality of agents and customers of a remotely-situated client entity and identify keywords, contexts and/or speech characteristic parameters from the digital voice data. In specific embodiments, the data-communications server 110 captures the digital voice data via a client on the agent side communicating with a VCC web client and a client on the server side (e.g., the provider-side client 102) and provides the digital voice data to the processing circuitry 106. In other embodiments, the agent-side client communicates the digital voice data to the provider-side client 102. The provider-side client 102 then provides the digital voice data to the analytics circuitry 103 for identification of keywords and/or speech characteristic parameters. The identification can include analyzing the digital voice data for matches to keywords and speech characteristic parameters stored in an archive and/or database 101. The database 101 can include a relational database management system (RDMS) which stores data securely and returns the data in response to requests from other applications, as implemented by a database management server, and which can temporarily store data in cache 105.

The stored keywords and/or speech characteristic parameters can be associated with outcomes, in some embodiments. Example outcomes can include sale, no sale, positive or negative tone/sentiment. A tone or sentiment of the audio conversation can indicate how the call is perceived by the customer. A tone or sentiment can be identified based on the speech characteristic parameters. Example speech characteristic parameters include frequency, velocity, and amplitude of the conversation.

In a number of specific embodiments, the speech characteristic parameters can be compared to one or more thresholds. For example, the processing circuitry 106 via the analytics circuitry 103 and the provider database 101 can identify a speech characteristic parameter is outside of a threshold value (e.g., indicates problem), and which can be indicative of a tone of sentiment of the conversation. As a specific example, audio above a particular amplitude and velocity can be indicative of a customer or agent who is upset or otherwise agitated. The thresholds can include generic thresholds (anything above a particular value), thresholds that are specific to geographic regions or types of customers, and/or baseline values of the specific agent. For example, if the agent's speech is faster and louder than their baseline, it can be indicative of an issue in the conversation.

The processing circuitry 106 can provide association of the keywords and/or speech characteristic parameters with outcomes based on the analysis. The associations can be stored in the database 101 and/or provided to a client data-communications server 121 as feedback via the feedback circuitry 104. The feedback can be provided to a manager of the client entity and used for training purposes. Alternatively and/or in addition, the feedback can be provided to the particular agent in real time or near real time, such as while the audio conversation is ongoing. The feedback can include specific phrases to use and/or suggested changes in speech characteristic parameters.

In other embodiments, the feedback is provided to a manager, such as via a report that summarizes a subset of agents for the client entity. The report can include customer interaction feedback using the associations indicating negative and positive outcomes and associated keywords and/or speech characteristic parameters.

In some embodiments, the processing circuitry 106 can identify a speech characteristic parameter outside of a threshold value (i.e., indicates problem) or a keyword that is associated with a (manager) trigger, and in response, automatically bridge a manager of the respective agent into the audio conversation. The processing circuitry 106 and/or the data-communications server 110 can access a database to identify the manager and information for bridging the manager into the audio conversation.

Figure 2:
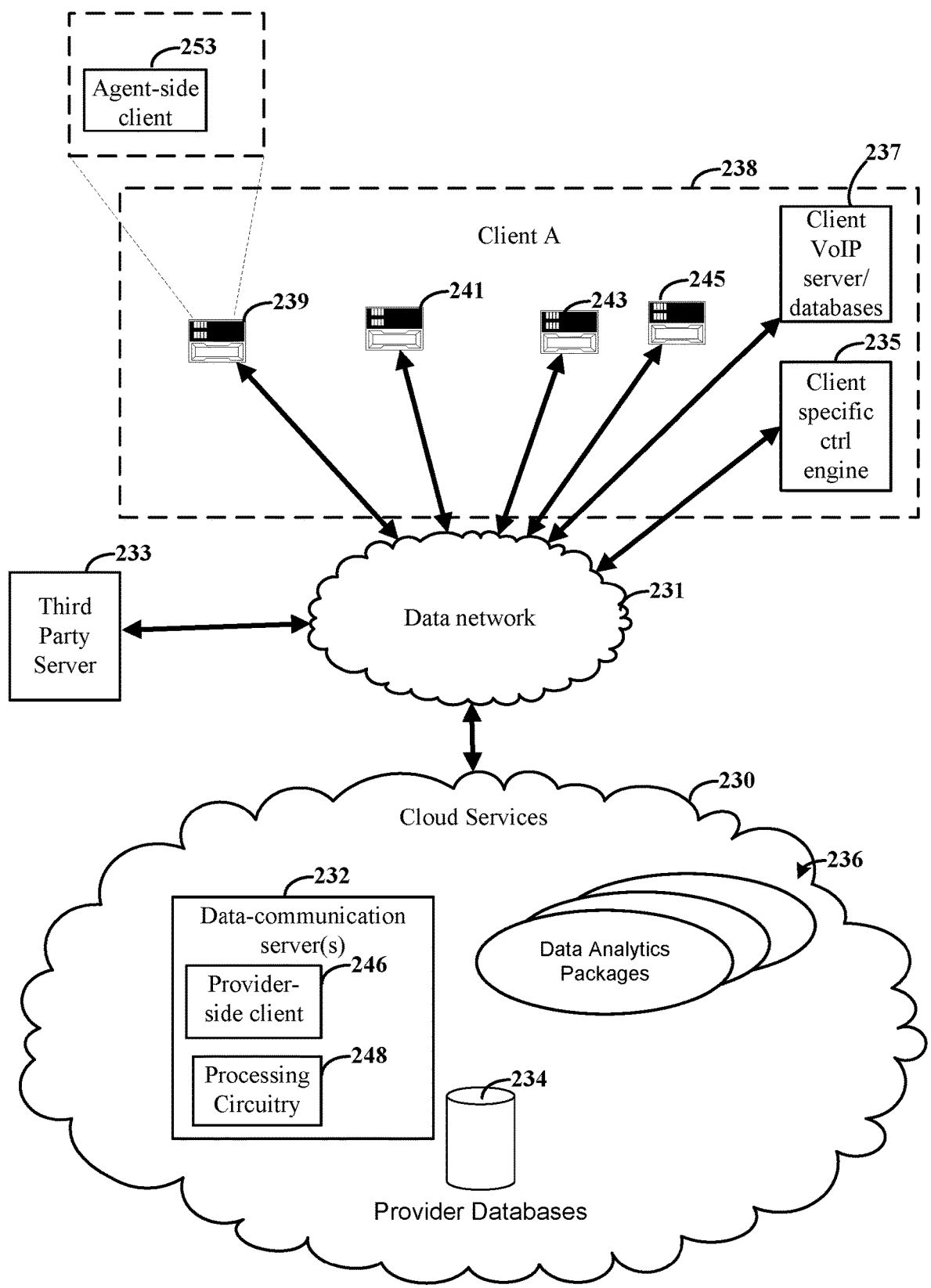
FIG. 2 illustrates an example data-communications system, consistent with embodiments of the present disclosure.

In some examples, the processing circuitry 106 can store the associations in a database as an archive that is accessible and that ties the keywords with dates of the conversations and the speech characteristic parameters of the particular transcribed audio conversations. The archive can be adjusted over time based on additional audio conversations. For example, the processing circuitry 106 can adjust the associations over time based on further analysis of digital voice data and provide the adjustments as feedback. Alternatively and/or in addition, the adjustments can be based on user input, such as an input from an agent or a manager, as further described herein FIG. 2 illustrates an example data-communications system, in accordance with various embodiments. In connection with the specifically-illustrated example, endpoint devices 239, 241, 243, 245 connected in a data network 231 are configured to place and receive VoIP telephone calls between other VOIP endpoint devices, and/or between non-VoIP endpoint devices, although embodiments are not limited to VoIP communications systems. Non-VoIP endpoint devices can include, for example, plain old telephone service (POTS) telephones and cellular-capable devices, which might also be VoIP capable (e.g., smart phones with appropriate VoIP software applications). The various endpoint devices 239, 241, 243, 245 are associated with an account 238 of a client, e.g., Client A, and include circuitry that is specially configured to provide calling functions that include interfacing with the appropriate circuitry of the call service provider used by the corresponding endpoint device. In many contexts, a VoIP endpoint device is a VoIP-capable telephone commonly referred to as IP phones. The VOIP endpoint devices 239, 241, 243, 245 can include, but are not limited to, desktop computers, mobile (smart) phones, laptop computers, and tablets, such as illustrated by 240, 242, 244. When each of the endpoint devices originates or receives a call in a telephone network, each can be characterized or referred to as an addressable call endpoint or a dial peer. The client can have or be associated with one or more client databases 237 for storing various data and a client specific control engine 235.

The data (e.g., call) routing and other services for the VoIP telephone calls can be provided by one or more data-communications servers 232 within a cloud services system 230 (e.g., configured to provide a PaaS to customers of the VoIP provider). In particular example embodiments, the data-communications servers 232 can be located within platform as a service (PaaS) computing servers, which are part of the cloud services system 230. The cloud services system 230 also includes one or more provider hosted client-specific control engines 235. A client-specific control engine can also be implemented locally by a client (e.g., 246). In some embodiments, data centers can be part of a cloud-based system where the hardware providing the cloud services is located in a number of different data centers with different physical locations. Consistent with embodiments, the cloud services can include session initiation protocol (SIP) servers, media servers, and servers providing other services to both VoIP endpoint devices and the users of the VOIP endpoint devices. In some instances, the various servers, including both the data-communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data-communications server which uses Session Initiation Protocol (SIP) to handle various call functions (e.g., call setup and tear down); however, the various embodiments discussed herein are not necessarily limited thereto. Consistent with the above and other embodiments disclosed herein, the data-communication servers are VoIP communications servers that are configured to establish a leg of the call from the VoIP endpoint devices (or dial peers) to another VOIP endpoint device, or to a gateway.

According to various embodiments, one or more data-communications servers 232 can monitor and analyze call data relating to digital call data of calls occurring using the VoIP endpoint devices 239, 241, 243, 245 via processing circuitry 248. For example, a data-communications server can be designed to receive digital voice data, such as directly from an agent-side client associated with particular endpoint devices. The agent-side client can communicate the audio or the digital voice data to the provider-side client. The provider-side client then provides the audio or digital voice data to processing circuitry (e.g., processing circuitry 248, although embodiments are not so limited and can include processing circuitry external to the data-communications server) for further analysis, such as transcribing to digital voice data, identifying keywords and/or speech characteristic parameters, identifying an outcome, and providing an association between the keywords and/or speech characteristic parameter using the identified outcome. The association can be stored in an archive in a provider-side database 234. In some specific embodiments, new keywords and/or parameter values are identified as having an association with an outcome. In other embodiments and/or in addition, a stronger correlation (e.g., probability) between the keywords and/or parameters is provided over time responsive to multiple verifications of an association. For example, a script running the data-communications server 232 can parse call digital call data and stored association to generate database queries that direct the data-communications server to provide a new association and/or update an existing association. The script can use the information to generate a report that can be used for training, promotions, and/or other analysis of agents. According to various embodiments, the database queries can be sent to a customer database 237. The feedback can be provided in real time or near real time to the endpoint device of the agent and/or can be accessed by a manager.

Consistent with certain embodiments, the data-communications server 232 can be configured to interface with a third party server 233 such as a customer server, or other third party servers. For instance, a CPXML document stored by the data network 231 can identify, based upon a received call, a Uniform Resource Identifier (URI) that points to customer servers, or to other third party servers.

The one or more data-communications servers 232 monitor and analyze call data relating to digital call data of calls occurring using the VOIP endpoint devices 239, 241, 243, 245 can further analyze such assessment for different customers over many entities and can provide the same as data analytic packages 236 via the processing circuitry 248. The packages 236 can be provided as a service to entities and can be based on geographic regions, markets, and type of customers. In specific embodiments, the packages 236 can be provided as a service and can be used for training agents for providing better customer interactions, such as suggested phrasing and words that result in particular outcomes and/or outcomes that are efficient. The packages 236 can be based on various customer-interaction metrics used to analyze the quality of calls.

As an example, the data analytics packages 236 can be offered as a cloud-based service to an entity to use for training purposes and/or otherwise improve or monitor customer interactions by agents. In some instances, the cloud based services can include automatic antitrust blockers. For example, the data service provider can have data blockers which can automatically block particular data provided as part of the data analytics packages 236 to particular entities based on antitrust concerns or privacy for other entities. Example feedback can include outputting a phrase to say during a live audio conversation to an endpoint device currently in use by the agent for the live audio conversation between the agent and the customer, outputting the phrase provided as data for display on user display of the endpoint device and/or audio provided to a speaker of the endpoint device, a customer feedback report using the associations indicative negative and positive outcomes and associated keywords and/or speech characteristic parameters associations.

In various embodiments, the data-communication system can be illustrated by FIG. 1, and/or FIG. 2 can be used to make data (e.g., call) routing decisions based on data across a variety of platforms. The routing decisions, in some specific embodiments, are based on a predicted inability to handle a volume of incoming data communications, such as calls, although embodiments are not so limited and can include rerouting responsive to other indications (such as region or branch of a client entity having negative customer interactions or other rational). The decision can be made based on data obtained from endpoint devices of agents, data-communications server(s) operated by the provider, and/or data-communications server operated by the client. In some embodiments, the prediction can be based on geography, system updates, schedules and keywords, and which include unification between platforms of the data-communications system to provide better routing decisions. In a number of embodiments, the call traffic can be rerouted based on analysis of digital voice data.

The unification can include the use of Outlook on the agent's endpoint device(s) to identify schedules, data from the client data-communication (e.g., VOIP) server to identify scheduled system updates and/or other system level issues, and digital voice data analyzed to identify when to reroute traffic, as well as other data such as data obtained from a search engine. The digital voice data may be used to identify an agent that is leaving when not scheduled to, or that may be otherwise unable to take telephone calls. As an example, one or more agents may unexpectedly be unable to answer phone calls due to illness, weather or other catastrophes of the geographic region, family issues, unplanned work meetings, among other reasons. In some specific embodiments, an event can occur that may impact a variety of agents located at different geographic locations. The unification of the different platforms can be used to identify patterns, such as particular events that different classification of agents (e.g., age, sex, geography, and other demographics) are more likely to be impacted by. As a specific example, agents that are between the ages of 18-25 may be more likely to ask for vacation time during the spring (e.g., Spring break). Additionally, agents that are known to have children may be more likely to ask for vacation time during Spring break of their children's school. As another specific example, patterns of a specific agent may be identified, such as common vacation requests (e.g., after or before a particular sports team has a game, during a political campaign, specific religious holidays, weather etc.)

Such situations may be identified based on keywords and may be associated with being out of the office or unable to answer calls (as an outcome in the archive). In addition to using the digital voice data to predict volume of calls that can be handled, the digital voice data can be used to make decisions of where to reroute the calls to. For example, calls can be rerouted to a region with similar types of keywords or speech characteristics and/or to particular agents that have experiences with the same type of customers.

In specific embodiment, the analysis can include artificial intelligence used to predict a call answer rate of an entity and/or specific regions of the entity. The call answer rate can be based on general trends over time, such as identified patterns of agents in response to different events and/or situations. The patterns can be specific to an agent, e.g., Agent A takes time off when it snows more than three inches, and/or specific to a region, e.g., a particular region has 20% of agents unable to answer calls after it snows or rains more than three inches. Such patterns can be based on weather, local events (e.g., sporting events, political events, school calendar, such as scheduled days off, fundraisers and other), non-local events (e.g., national sporting events, religious holidays, general time of year) illness or other health related trends. As an example, a first entity may allow their agents to work remotely from home and a second entity may not. The second entity may be more greatly impacted by weather related events (e.g., more agents cannot make it to work and thus cannot answer calls) than the first entity. Such trends may be different for different locations and different demographic groups of agents. For example, agents of a particular age may be more likely to be unable to answer calls after a local sporting events than other agents, although embodiments are not so limited.

As described above, the data-communications system illustrated by FIG. 2 can be used to predict an ability to handle call volume, in accordance with various embodiments. The routing decisions can be made by one or more of the data-communications servers 232 based on a prediction of call volume that can be handled by agents of the entity. The predicted call volume can be determined using processing circuitry 248 and based on integration of data across a plurality of platforms, such as agent's machines (Outlook 651 to identify schedules), client data-communications server 237 (identify updates on server/system or other system level issues), and provider data-communications server 232 (including the previously described digital voice data and analytics of data to identify/predict when calls cannot be made), as well as other sources (e.g., Internet-based data). The processing circuitry 248 can analyze data identifying schedules of agents, updates to the server or system, system level issues, and predictions of when agents may be available and/or how long calls may take based on archived data stored in the provider databases 234.

As previously described, the one or more data-communications servers 232 can monitor and analyze call data relating to digital call data of calls occurring using the endpoint devices 239, 241, 243, 245 and the processing circuitry 238. For example, a data-communications servers 232 can be designed to receive digital voice data, such as directly from an agent-side client (e.g., agent-side client 253) associated with particular endpoint devices and provide the same to the processing circuitry 248. The processing circuitry 248, although illustrated as a component of the data-communications server 232, can be external to the server 232 in various embodiments. The agent-side client 253 can communicate the audio or the digital voice data to the provider-side client 246. The provider-side client 246 then provides the audio or digital voice data to the processing circuitry 248 for further analysis, such as transcribing to digital voice data, identifying keywords and/or speech characteristic parameters, identifying an outcome, and providing an association between the keywords and/or speech characteristic parameter using the identified outcome. The association can be stored in an archive in a provider-side database 234. In some instances, new keywords and/or parameter values are identified as having an association with an outcome. In other embodiments and/or in addition, a stronger correlation (e.g., probability) between the keywords and/or parameters is provided over time responsive to multiple verifications of an association. For example, a script running the data-communications server 232 can parse call digital call data and stored association to generate database queries that direct the data-communications server 232 to provide a new association and/or update an existing association. The script can use the information to generate a report that can be used for training, promotions, and other analysis of agents. According to various embodiments, the database queries could be sent to a customer database and/or another third party server 233. The feedback can be provided in real time or near real time to the endpoint device of the agent and/or can be accessed by a manager.

In some instances, the analysis by the processing circuitry 248 can include predicting a call volume that can be handled by various agents and which can be used for routing decisions. The call volume predicted can be based on the data analytics packages 236 and/or archived data in the provided databases 234 such as identification of average call times, which can be different for different types of customers, and for the respective agents, types of calls or customers predicted to be calling (e.g., average for time of year and geographic location as an example), prediction of system level issues and predicted agents that are available to receive calls. The prediction of agents can be based on data from the agent's machine(s), such as Outlook or other calendar services or applications 251, or within the database 234 or as part of a data analytics package 236. For example, the digital voice data from a particular agent may include identification of a time the agent will not be available (has another call, a meeting, etc.). As another example, the data analytics package 236 may include identification of types of agents that may be unavailable in response to different events or times of the year (e.g., Spring break time, particular holidays, sporting events, natural disasters etc.) and/or based on general trends across the entity and/or a particular region of the entity.

Additionally, decisions on where to reroute the calls to can be based on the previously described data analytics. For example, customers from the Southern region of the United States may respond better to different speech characteristics than customers from the Northeast region of the United States. Such associations may be determined over time and using the database 234 to capture the digital voice data associations, and may be across different entities, and can be used to make decisions on where to reroute calls to. Such rerouting decision may be performed with or without the call volume predictions.

In response to a client not having such a service, the processing circuitry 248 can predict a call volume that can be handled is less than a predicted incoming call volume and communicate the same to the data-communications server 232. The data-communications server 232 can offer the rerouting as a service to the client.

Figure 3:
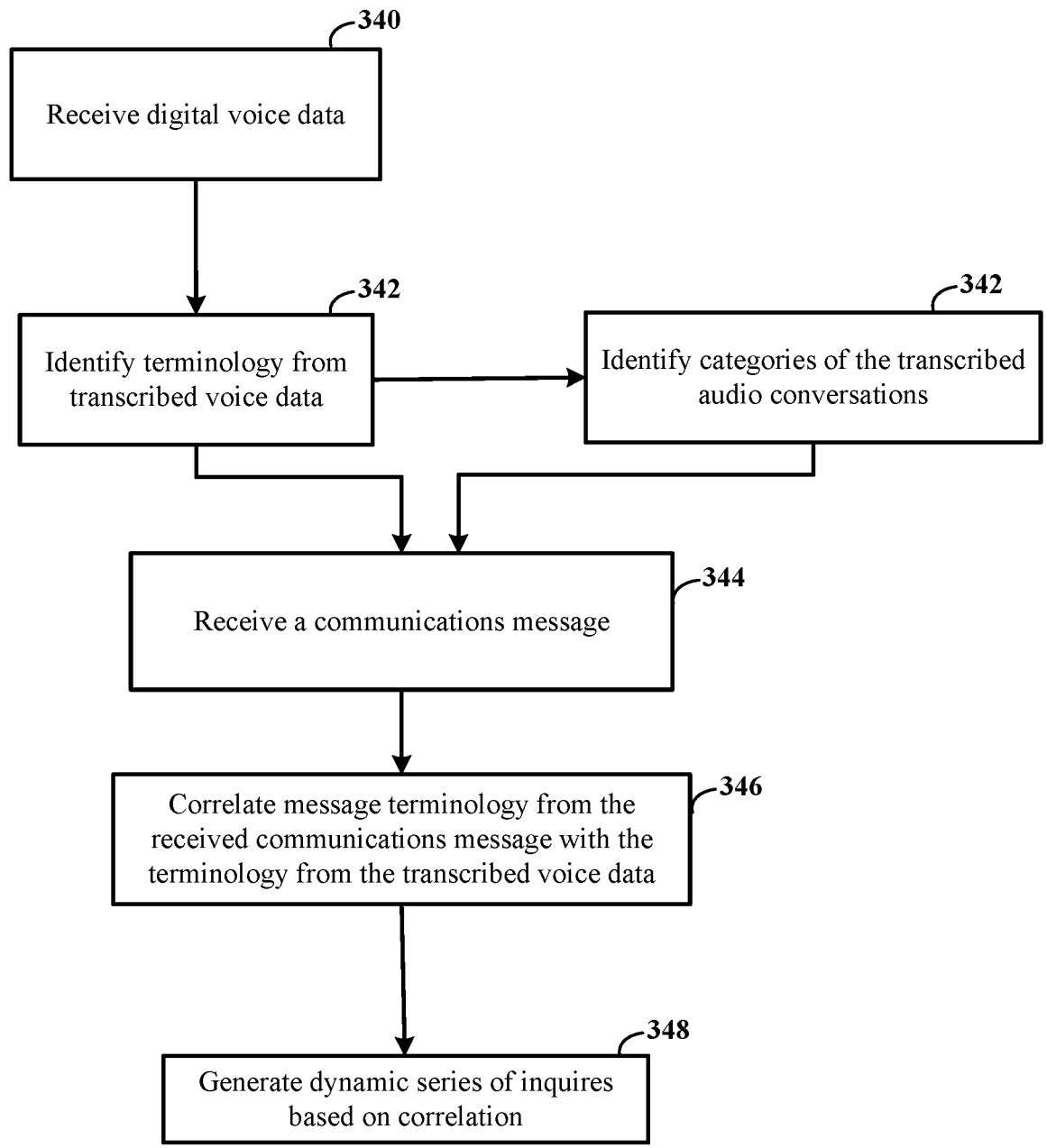
FIG. 3 illustrates an example method for use in a data-communications system, consistent with embodiments of the present disclosure.

FIG. 3 illustrates an example method for use in a data-communications apparatus, in accordance with various embodiments. The method can be used for analyzing digital voice data and providing feedback as a service.

At 340, the method includes receiving, at processing circuitry in communication with a data-communications server, digital voice data indicative of transcribed audio conversations between a plurality of agents and customers of a remotely-situated client entity. The digital voice data can be transcribed from audio by the endpoint device of the agents and communicated to the processing circuitry and/or the data-communications server via clients on the agent and provide side. In other embodiments, a client server can transcribe the digital voice data and communicate the same to the data-communications server and/or the data-communications server can transcribe communicated audio waves.

At 342, the digital voice data can be analyzed, via the processing circuitry, using a database, such as a database of archived data including associations of keywords and/or speech characteristic parameters and outcomes. The digital voice data can be analyzed to identify keywords, certain contexts (e.g., business, personal, service-call inquiry, warranty inquiry) and speech characteristic parameters of the digital voice data, identify outcomes of the respective transcribed audio conversations, generate associations with at least one of the keywords and speech characteristic parameters with the identified outcomes, and/or providing the associations to a client data-communications server as feedback on audio conversations with the customers. For example, via an inbound text communication at the service provider side, the processing circuitry is able to analyze the digital voice data to identify a warrant inquiry as an example context from the initiator of the call. While "warranty" may also be identified as a keyword used in the inbound (e.g., text) communication, through the analysis the processing circuitry is also able the identify "warranty" whether or not this keyword is used in the inbound text communication, and this may be by deciphering a sequence of other non-keywords such as "recent purchase", "doesn't work" and/or "problem", "receipt", and "within [time period]".

The processing circuitry may also operate in response by discerning whether to ask specific questions (and providing responsive answers such as by lookup in a memory circuit such as a frequently-asked questions database) to help address or resolve identified issue associated with the inbound communication, and/or by discerning that the matter may best be addressed or resolved by routing the call to a specific agent/representative or expert having special knowledge of the identified context and/or other subject matter discerned from the inbound communication (again, whether or not keywords are identified and/or specific questions are asked). The specific agent/representative or expert may be identified through a database in a memory circuit which may be associated with: a profile or database specific to a customer-entity subscribing to the service provider's services; a profile or database specific to a certain user or an endpoint device (e.g., smartphone); and/or a generally-accessed database such as may be provided by a third party or by the service provider for use by multiple disparate customers.

As another example, at 344, the digital voice data is analyzed and used to identify keywords and speech characteristic parameters of the digital voice data and compare the identified keywords and parameters to a database. The database has stored correlations or associations of keywords and parameters to tones or sentiments of a conversation and outcomes of the conversations. The associations or correlations can include a probability of the match indicating the outcome. In response to a match, at 346, the correlated archived outcomes is identified. In response to no match and/or in addition (can have matching and nonmatching keywords), at 348, new keywords can be identified. At 350, the outcome of the respective transcribed audio conversation can be identified. The outcome can be identified based on a match and a respective correlation and/or based on analysis of metadata in the digital voice data. In some embodiments, an agent can enter metadata that is correlated with the digital voice data and/or that otherwise ties to the transcript. The metadata can identify the outcome.

The use of the archived database, in various embodiments, can include performing artificial intelligence to determine the outcome. The processing circuitry and/or data-communications server can analyze patterns to identify and associate different keywords, phrases, and/or speech characteristic parameters with particular outcomes, and which can be different for different types of customers (e.g., different geographic regions, fields, sexes, ages, and other categorizations). The processing circuitry and/or data-communications server can analyze resulting data to determine the outcome, such as identifying a sale, retention of a customer, hang-up, loss of a customer, resolution of a problem, which can include a specific and identified problem or a general problem, among other outcomes. Overtime, the processing circuitry and/or data-communications server can update the database based on additional digital voice data. For example, at 352, the method includes generating associations with at least one of the keywords and speech characteristic parameters with the identified outcomes. The associations can include new keywords that are associated with particular outcomes, new outcomes, and increasing or decreasing a correlation of keywords or parameters with an outcome. For more general information on artificial intelligence and specific information on achieving artificial intelligence, reference to made to U.S. Publication No. 2004/0143559, filed on Jan. 13, 2004, entitled "System and Method for Developing Artificial Intelligence," and U.S. Pat. No. 5,473,732 filed on Feb. 7, 1995, entitled "Relational Artificial Intelligence System," each of which are fully incorporated herein for their teachings.

In specific embodiments, the associations can be classified differently for different types of customers. For example, the processing circuitry can provide different associations based on characteristics of the particular audio conversations, including characteristics selected from the group consisting of: geographic region of the customer, sex of the customer, age of the customer, type of customer, and a combination thereof. The associations are stored in the provider database as an archive that is accessible and that ties the keywords with dates of the conversations and the classifications, and which identifies keywords and phrases to avoid for particular types of customers and keywords and phrases to use for the particular types of customers.

As a specific example, and not intended to be limiting, a first region can include a Northeastern region of the United States and a second region can include a Southern region of the United states. It may be identified that customers from the first region speak at a greater frequency and amplitude that customers from the second region. As another example, it may be identified that women speak at a lower amplitude than men. A third region can include Southern Pacific Coast of the United States (e.g., parts of California) which may include customers that speak at a similar frequency and amplitude as customers from the first region. However, embodiments are not so limited and the above is provided only as an illustrative example. Additionally each of the about may have specific words and phrases to avoid, as they have a greater probability then other words at causing a positive or negative outcome. As a specific example, the second region may have a positive outcome associated with calling the customer "Miss" or "Mr." whereas customers from the third region may have negative outcome associated with the same or may have a greater probability of a positive outcome when addressing customers by their first name.

In various embodiments, feedback can be provided. For example, at 354, the method further includes providing the associations to a client data-communications server as feedback on audio conversations with the customers. The feedback can be provided to the agent in real time and used by the agent to assist in achieving a positive outcome or to otherwise adjust an outcome of the conversation. In other embodiments, the feedback can be provided after the call is finished and used to train the user. For example, the feedback can be used to train the user in how to handle different situations. In some instances, a report is generated that can be reviewed by a manager, as previous described. Further, in specific embodiments, a manager can be automatically bridged into a VoIP call responsive to particular keywords (e.g., swearing), based on the specific customer, and/or speech characteristics parameters outside a threshold. In such a manner, the feedback can include or otherwise be indicative of customer feedback which is provided to the client entity without actively querying the customer, such as with the customer actively providing answers to a questionnaire.

In a number of related embodiments, the associations between keywords and/or speech characteristic parameters can be adjusted over time. The adjustment can be responsive to different outcomes or input from the agent or other users. For example, the processing circuitry can provide a respective association with at least one of the keywords and speech characteristics with the identified outcome to an agent associated with the audio conversation or a manager associated with the agent. In a number of embodiments, the associations can be locked and a manager reviews the recommended adjustments (by the agent) and approves or denies the adjustment. In response to the agent or manager providing an input indicating the associated is incorrect, the association is adjusted. In other embodiments and/or in addition, the association can be stored in response to the agent or manager providing an indication indicating the associated is correct or not providing any indication within a threshold period of time.

Figure 4:
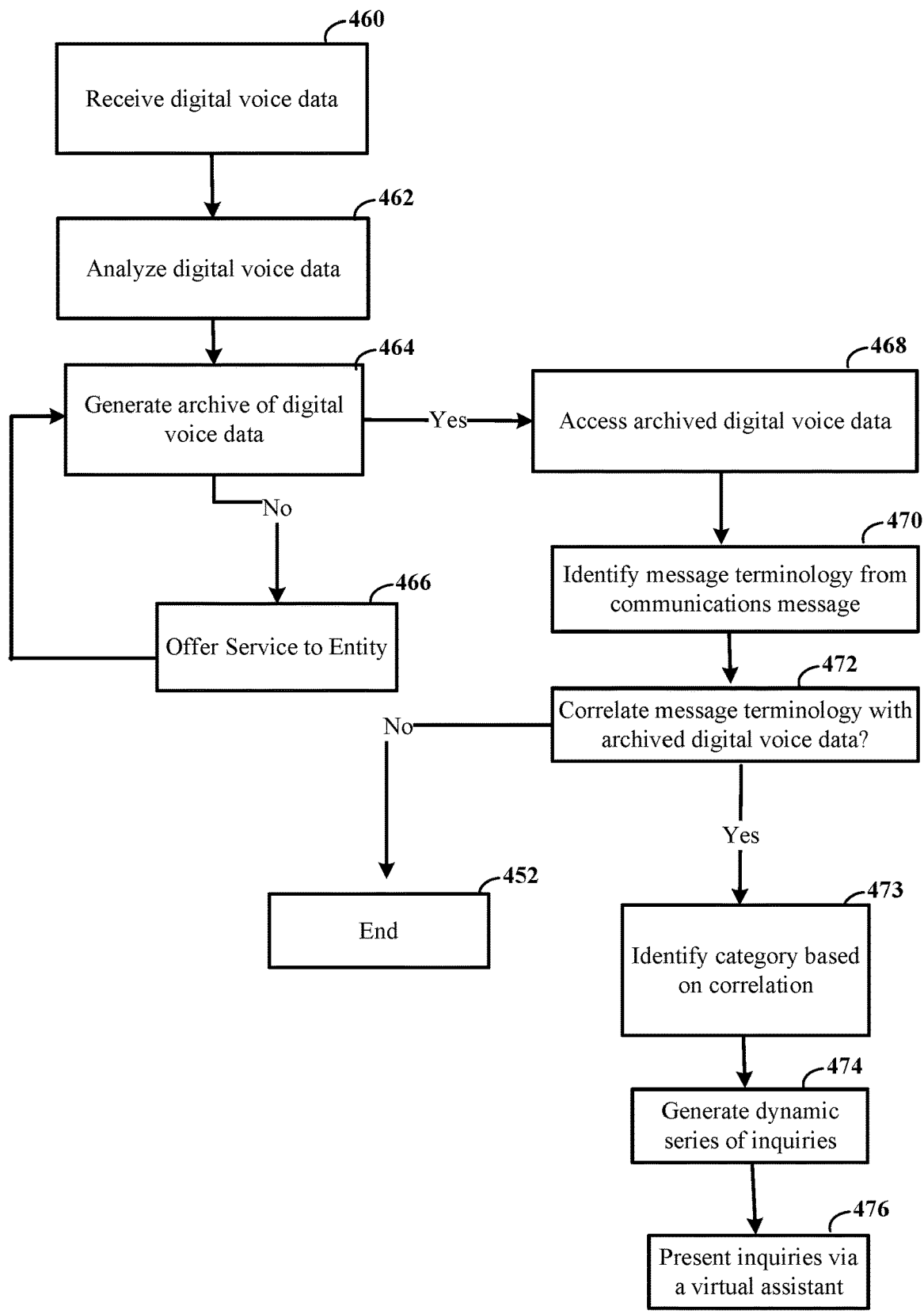
FIG. 4 illustrates an example method for use in a data-communications system, consistent with embodiments of the present disclosure.

FIG. 4 illustrates an example method for use in a data-communications system, in accordance with various embodiments. The method can be used to analyze a predicted call volume that can be handled by an entity and/or a subset of agents of entity and providing rerouting decisions based on the predicted call volume.

The method at 460 can include receiving, at processing circuitry in communication with a data-communications server, digital voice data indicative of transcribed audio conversations between a plurality of agents and customers of at least one of a plurality of remotely-situated client entities. The digital voice data can be transcribed from audio provided by the endpoint device of the agent and communicated to the data-communications server via clients on the agent and provider side. The data-communications server can communicate the digital voice data to the processing circuitry and/or the processing circuitry can otherwise form part of the data-communications server. In other embodiments, a client data-communication server can transcribe the digital voice data and communicate the same to the data-communications server and/or the data-communications server can transcribe communicated audio waves.

At 462, the digital voice data can be analyzed, via the processing circuitry using a database, such as a database of archived data including associations of keywords and/or speech characteristic parameters and outcomes, as previously described The digital voice data can be analyzed to identify keywords and speech characteristic parameters of the digital voice data, identify outcomes of the respective transcribed audio conversations, generate associations with at least one of the keywords and speech characteristic parameters with the identified outcomes, and/or providing the associations to a client server as feedback on audio conversations with the customers.

In specific embodiments, the associations can be classified differently for different types of customers. For example, the processing circuitry can provide different associations based on characteristics of the particular audio conversations, including characteristics selected from the group consisting of: geographic region of the customer, sex of the customer, age of the customer, type of customer, and a combination thereof. The associations are stored in the provider database as an archive that is accessible and that ties the keywords with dates of the conversations and the classifications, and which identifies keywords and phrases to avoid for particular types of customers and keywords and phrases to use for the particular types of customers.

At 464, a determination is made as to whether the entity has enabled a platform unification rerouting service. The platform unification rerouting service can include the prediction of the call volume that can be handled (e.g., processed by agents or a subgroup of agents) and rerouting based on the same. The predicted call volume and determination of rerouting can occur via access of a variety of data across multiple platforms. For example, the platforms can include the provider database, the remotely-situation client entities, data analysis package services, a client (VOIP) server, and a third party server, among other resources such as the Internet. In response to determining the client has not enabled the service, the service can be offered to the client at 466.

In response to determining the service is enabled, at 468, the data-communications server can access the other platforms. For example, the data-communications server can access calendar information for agents the least one of the plurality of remotely-situated client entities (e.g., access the endpoint devices for calendar information), and a client (VOIP) server for geographic information of the agents and system parameters of the remotely-situated client entity. Such data can be combined with the archived digital voice data of agents of the entity, as well as other types of data, and analyzed to predict a call answer rate for particular agents of a geographic region of the entity for a period of time, at 470. The predicted call answer rate may be below or above a normal threshold and/or below a predicted call rate (e.g., how many calls will be made that agents are to answer). In other embodiments and/or in addition, during real time, the actual call threshold, e.g., call made to agents in the region, can be greater than the predicted call answer rate. A determination of the above can be made at 472. In response to the predicted (or actual) call answer rate being outside (e.g., greater than) the threshold, the process can end or the processing circuitry and data-communications server may use the data analyzed to offer other services to the entity at 452 such as data analytics packages, feedback on customer interactions.

In some specific embodiments, the processing circuitry can predict (or the actual can be) the call answer rate for particular agents of the geographic location to be below a threshold responsive to identifying greater than a threshold number of agents are out of the office for the period of time, trigger words in the archived digital voice data indicative of illness, weather, catastrophes associated with the geographic region and the period of time, system parameters indicating schedule outages or system updates for the period of time, and/or indications of a likely increase in calls (e.g., weather events may indicate increase calls for an automobile and home insurance company). For example, the processing circuitry can predict the call answer rate for particular agents by weighing each of the information identified from the archived digital voice data, the calendar information, and the system parameters.

As a specific example, the processing circuitry can predict the call answer rate for particular agents of the geographic location to be outside threshold responsive to identifying less than a threshold number of agents are out of the office for the period of time, trigger words in the archived digital voice data indicative of increased productivity during the period of time; and/or system parameters indicating increased productivity for the period of time. In some embodiments, an increasing number of incoming calls can be rerouting to the geographic region in response to the prediction. For example, the analysis may indicate that the particular agents can handle a higher volume of calls than are being routed. In other instances, the analysis may identify that the particular agents can handle a lower volume of calls than are being routed.

As another specific example, the processing circuitry can analyze the archive of digital voice data indicative of transcribed audio conversations between the plurality of agents and customers to identify keywords and speech characteristic parameters associated with the customers and the outcomes of the transcribed audio conversations. The server can predict the call answer rate for particular agents of the geographic region based on identified keywords and outcomes of the transcribed audio calls associated with the particular agents (e.g., have better success, can have better outcomes for particular customers). The processing circuitry can also provide a weight of the identified information and sum the weights, wherein a respective summed weights outside a threshold indicates rerouting of calls for the respective geographic region.

In response to the predicted call answer rate for particular agents of a geographic region of the remotely-situated client entity for a period of time being outside a threshold, such as being less than an actual call in rate or a predicted time for answer calls in the period of time, at 473, the calls can be rerouted, by the data-communications server, for the remotely-situated client entity based on the predicted call answer rate. The rerouting of the incoming calls can further include providing an indication of the rerouting to an identified personnel of the client entity as identified from the client data-communications server, and rerouting in response to verification received from the identified personnel (allow for feedback/don't auto reroute).

In some embodiments, the processing circuitry can identify if there is a service available to prevent the rerouting in the future for the client at 474. Such a service can include additional server resources, server updates, etc. In response to determining a service is available, at 476, the service is offered to the client. If no service is available, the process can end. As a specific example, feedback can be provided to an identified personnel responsive to the rerouting, the feedback including a service provided by the data-communications server that increases a call rate of the geographic region (e.g., provide backup server that would have prevented a decrease in call rate).

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., using reference numerals in the FIGS. depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches disclosed herein. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. For use in a data communications system providing data communications services to a plurality of remotely-situated client entities ("client entities"), a computer-implemented method comprising:

accessing, in response to providing the data communications services and via data-processing computer circuitry, an archive of digital voice data indicative of transcribed audio conversations respectively involving different client stations participating in data communications, wherein each of the different client stations is associated with one of the client entities;

for use by one of the client entities, correlating a data-communications call or text-based message, received by a virtual assistant associated with the one of the client entities, with information that is from the archived digital voice data and is associated with another one of the client entities while blocking use of, by the one of the client entities, certain information of concern or private to the other one of the client entities; and automatically configuring the virtual assistant, based on the data-communications call or text-based message being correlated and via the data-processing computer circuitry, to address or otherwise process the data-communications call or text-based message received by the virtual assistant.

2. The computer-implemented method of claim 1, further including discerning an inquiry, via the data-processing computer circuitry, from an initiator of the data-communications call or text-based message.

3. The computer-implemented method of claim 1, further including identifying, in response to an inquiry from an initiator of the data-communications call or text-based message, the information as corresponding to at least one intent or at least one topic.

4. The computer-implemented method of claim 1, further including prompting a selected set of inquiries to be presented to an initiator of the data-communications call or text-based message, via the data-processing computer circuitry, and then automatically prompting, in response to further information discerned from the data-communications call or text-based message, an adjustment of the selected set of inquiries for presentation to the initiator, wherein the adjustment is implemented or managed by a representative of the one of the client entities.

5. The computer-implemented method of claim 1, further including selecting one of different sets of inquiries, for presentation to an initiator of the data-communications call or text-based message, and in response to an inquiry from the initiator being identified or discerned by the data-processing computer circuitry.

6. The computer-implemented method of claim 5, further including identifying or discerning, via the data-processing computer circuitry, an inquiry from the initiator of the data-communications call or text-based message, and presenting the one of different sets of inquiries as selected, to the initiator.

7. The computer-implemented method of claim 5, further including identifying or discerning, via the data-processing computer circuitry, an inquiry from the initiator of the data-communications call or text-based message.

8. The computer-implemented method of claim 1, further including presenting one of different selectable sets of inquiries to an initiator of the data-communications call or text-based message and in response to the data-processing computer circuitry indicating a specific type of inquiry associated with the data-communications call or text-based message from the initiator.

9. The computer-implemented method of claim 1, further including predicting, via the data-processing computer circuitry and based on the archive of digital voice data and on the data-communications call or text-based message, a specific type of inquiry associated with the data-communications call or text-based message.

10. The computer-implemented method of claim 1, further including selecting, based on the archive of digital voice data and on the data-communications call or text-based message, one of different selectable sets of inquiries to present to an initiator of the data-communications call or text-based message.

11. The computer-implemented method of claim 1, further including:
identifying or predicting, via the data-processing computer circuitry and based on the archive of digital voice data and on the data-communications call or text-based message, a specific type of inquiry associated with the data-communications call or text-based message, and
prompting, in response to said identifying or predicting, one of different selectable sets of inquiries to be presented to an initiator of the data-communications call or text-based message.

12. The computer-implemented method of claim 1, further including:
identifying an inquiry based on the data-communications call or text-based message, and
addressing, in response to the data-processing computer circuitry discerning the information as corresponding to at least one intent or at least one topic, the inquiry by routing or otherwise processing the data-communications call or text-based message received by the virtual assistant.

13. The computer-implemented method of claim 1, further including:
identifying an inquiry based on the data-communications call or text-based message, and
causing, in response to the data-processing computer circuitry identifying the inquiry, the data-communications call or text-based message to be routed to a selectable endpoint device.

14. The computer-implemented method of claim 1, further including:
identifying an inquiry based on the data-communications call or text-based message, and
causing, in response to the data-processing computer circuitry identifying the inquiry, specific processing of the data-communications call or text-based message by indicating one from among different sets of selectable communications to be presented to an initiator of the data-communications call or text-based message.

15. The computer-implemented method of claim 14, wherein the one from among different sets of selectable communications to be presented to the initiator, corresponds to a series of communications.

16. The computer-implemented method of claim 14, wherein the one from among different sets of selectable communications to be presented to the initiator, corresponds to a dynamic series of inquiries.

17. The computer-implemented method of claim 1, further including:
identifying an inquiry based on the data-communications call or text-based message,
causing, in response to the data-processing computer circuitry identifying the inquiry, the data-communications call or text-based message to be routed to a selectable endpoint device; and
addressing or resolving the inquiry by connecting an initiator of the data-communications call or text-based message with an agent or expert having specific knowledge associated with the inquiry.

18. A data communications system to provide data communications services, via a set of one or more servers, to a plurality of remotely-situated client entities ("client entities"), the data communications system comprising:
  data-processing computer circuitry to
    use, in response to providing the data communications services, an archive of digital voice data indicative of transcribed audio conversations respectively involving different client stations participating in data communications, wherein each of the different client stations is associated with one of the client entities;
    for use by one of the client entities, correlate a data-communications call or text-based message, received by a virtual assistant associated with the one of the client entities, with information that is from the archived digital voice data and is associated with another one of the client entities while blocking use of, by the one of the client entities, certain information of concern or private to the other one of the client entities; and
    indicate an option for how to configure the virtual assistant, based on the data-communications call or text-based message meeting predefined client-specific criteria assessed by the data-processing computer circuitry, to address or otherwise process the data-communications call or text-based message received by the virtual assistant.

19. A data communications system to provide data communications services, via a set of one or more servers, to a plurality of remotely-situated client entities ("client entities"), the data communications system comprising:
  data-processing computer circuitry to
    access, in response to providing the data communications services, an archive of digital voice data indicative of transcribed audio conversations respectively involving different client stations participating in data communications, wherein each of the different client stations is associated with one of the client entities;
    for use by one of the client entities, correlate a data-communications call or text-based message, received by a virtual assistant associated with the one of the client entities, with information that is from the archived digital voice data and is associated with another one of the client entities while blocking use of, by the one of the client entities, certain information of concern or private to the other one of the client entities; and
    automatically configure the virtual assistant, based on the data-communications call or text-based message being correlated and via the data-processing computer circuitry, to address or otherwise process the data-communications call or text-based message received by the virtual assistant.

20. The data communications system of claim 19, wherein the data-processing computer circuitry is to identify at least one intent or at least one topic as being associated with the data-communications call or text-based message.

* * * * *